(12) United States Patent
Hong

(10) Patent No.: US 6,589,300 B2
(45) Date of Patent: Jul. 8, 2003

(54) METHOD FOR PRODUCING LITHIUM SECONDARY BATTERY

(75) Inventor: Ji Jun Hong, Seoul (KR)

(73) Assignee: Kokam Engineering Co., Ltd., Chungcheongnam (KR)

( * ) Notice: Subject to any disclaimer, the term of this patent is extended or adjusted under 35 U.S.C. 154(b) by 259 days.

(21) Appl. No.: 09/822,058

(22) Filed: Mar. 30, 2001

(65) Prior Publication Data
US 2001/0049872 A1 Dec. 13, 2001

(30) Foreign Application Priority Data
Jun. 12, 2000 (KR) ........................................ 2000-32284

(51) Int. Cl.[7] ........................... H01M 6/00; H01M 2/14; H01M 2/16
(52) U.S. Cl. .................... 29/623.5; 29/623.4; 29/623.3; 429/136
(58) Field of Search ............................ 29/623.1, 623.5; 429/136, 208, 250, 142

(56) References Cited

U.S. PATENT DOCUMENTS

| | | | |
|---|---|---|---|
| 4,778,479 A | * 10/1988 | Romling et al. | ............ 29/623.1 |
| 5,498,489 A | 3/1996 | Dasgupta et al. | |
| 5,667,911 A | * 9/1997 | Yu et al. | ..................... 429/144 |
| 5,795,357 A | * 8/1998 | Kim | ........................ 29/623.5 |
| 5,989,741 A | 11/1999 | Bloomfield et al. | |
| 6,235,066 B1 | * 5/2001 | Inuzuka et al. | ............ 29/623.5 |
| 6,284,405 B2 | * 9/2001 | Kaido et al. | ................... 429/94 |
| 6,423,449 B1 | * 7/2002 | Hong | ..................... 429/231.95 |
| 6,426,165 B1 | * 7/2002 | Coustier et al. | ............ 429/316 |

FOREIGN PATENT DOCUMENTS

| | | |
|---|---|---|
| DE | 19540845 A1 | 5/1996 |
| EP | 0602976 A1 | 12/1993 |
| EP | 0682376 A1 | 5/1995 |

OTHER PUBLICATIONS

B.K. Petrin, *Chemical Sources of Electrical Current with a High Energy Capacity*, Moscow, VINITI, pp. 76, 77 (1986).

* cited by examiner

Primary Examiner—Patrick Ryan
Assistant Examiner—Tracy Dove
(74) Attorney, Agent, or Firm—Fredrikson & Byron PA

(57) ABSTRACT

The present invention relates to a method for producing a lithium secondary battery and more particularly, to a method for producing a lithium secondary battery comprising steps of unwinding a separation film for insulating electrodes by a roller, simultaneously coating an adhesive by an air injector on both surfaces of the separation film at regions where cathode plates and anode plates are to be attached to the separation film, simultaneously bonding the cathode plates and the anode plates respectively on the surfaces of the separation film while allowing the electrode plates on each surface of the separation film to be uniformly spaced apart from one another, laminating the bonded cathode plates and anode plates, and laminating the separation film bonded with the cathode plates and the anode plates so that the cathode plates and the anode plates are arranged alternately. According to the present invention, a lithium secondary battery can be made readily and efficiently.

3 Claims, 4 Drawing Sheets

METHOD FOR PRODUCING LITHIUM SECONDARY BATTERY

BACKGROUND OF THE INVENTION

1. Field of the Invention

The present invention relates to a method for producing a lithium secondary battery.

More particularly, the present invention relates to a method for producing a lithium secondary battery, which involves simultaneously bonding cathode plates and anode plates cut in a uniform size to both surfaces of a separation film which runs continuously in a vertical direction, in such a fashion that the electrode plates on each surface of the separation film are uniformly spaced apart from one another, and folding the separation film several times to alternate the cathode plates and the anode plates, thereby being capable of achieving a simplified and consistent production process while readily providing a cell having various shapes, sizes and a desired capacity.

2. Description of the Related Art

Such lithium secondary batteries of a lamination type having the above-mentioned construction are well known. Typically, the batteries are produced by bonding a plurality of cathode plates to one surface of a separation film which runs in a horizontal direction, bonding a plurality of anode plates to other surface of the separation film, in which the anode plates are positioned opposite to the cathode plates, and folding the separation film several times so that the cathode plates and anode plates are arranged alternately, as shown in FIG. 2.

In accordance with the conventional method in which processes are carried out in a horizontal fashion, however, the bonding process and the lamination process are carried out, in separate fashion, for respective surfaces of the separation film on which the cathode plates and the anode plates are to be bonded. As a result, the coating process of the adhesive, the bonding process of cathode plates or anode plates and the laminating process have to be conducted twice, leading a degradation in process efficiency. Furthermore, since a solenoid valve type nozzle is used for an injection of the adhesive, it is difficult to control an amount of the injected adhesive. In addition, the spreading degree of the adhesive is varied with the viscosity of the adhesive. Also, a string phenomenon may occur. Accordingly, the production of batteries having a poor quality is increased.

SUMMARY OF THE INVENTION

Therefore, an object of the invention is to solve the above-mentioned problems involved in the prior art, and to provide a method for producing a lithium secondary battery by producing the lithium secondary battery in a vertical fashion so as to increase the efficiency of producing the battery and lower the defective proportion of the battery.

In accordance with the present invention, a method for producing a lithium secondary battery is provided, in which the method comprises:

(1) unwinding a separation film for insulating electrodes by a roller;

(2) simultaneously coating an adhesive by an air injector on both surfaces of the separation film at regions where cathode plates and anode plates are to be attached to the separation film;

(3) simultaneously bonding the cathode plates and the anode plates respectively on the surfaces of the separation film while allowing the electrode plates on each surface of the separation film to be uniformly spaced apart from one another;

(4) laminating the bonded cathode plates and anode plates; and (5) laminating the separation film bonded with the cathode plates and the anode plates so that the cathode plates and the anode plates are arranged alternately.

The anode plates used according to the present invention are prepared by coating an anode active material on a metal foil such as aluminum, drying the metal foil, and cutting the dried metal foil to have a desired size. The anode active material that can be used in the present invention includes, but is not limited to, a material, such as $LiCO_2$, $LiMn_2O_4$, having a spinel or layered structure. Similarly, the cathode plates used according the present invention are prepared by coating a cathode active material on a metal foil such as copper, drying the metal foil, and cutting the dried metal foil to have a desired size. The cathode active material that can be used in the present invention includes, but is not limited to, graphite or carbon-based materials treated to have an electrochemical property, typically carbon materials based on mesocarbon microbeads (MCMB) and meso-phase pitch carbon film, etc.

As the separation film, single layer or multi-layered porous polymer films composed of polyethylene or polypropylene can be used. The adhesive adapted to attach cathode plates or anode plates is coated on the surfaces of the separation film by using an air injector. The air injector which applies the printing principal of inkjet marking is adapted to inject the adhesive through a nozzle by using compressed air so that the adhesive can be coated on the both surfaces of the separation film in a vertical fashion. When using the nozzle of the air injector according to the present invention, the injected adhesive has a ring shape, whereby the contact area between the adhesive layer and the electrode plate and the thickness of the adhesive layer can be reduced. Also, an excessive overcoating of the adhesive can be prohibited. Therefore, it is possible to achieve a reduction in string phenomenon and an improvement in electronic conductivity.

Preferably, the nozzle of the air injector has an inner diameter of 50 to 300 μm.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
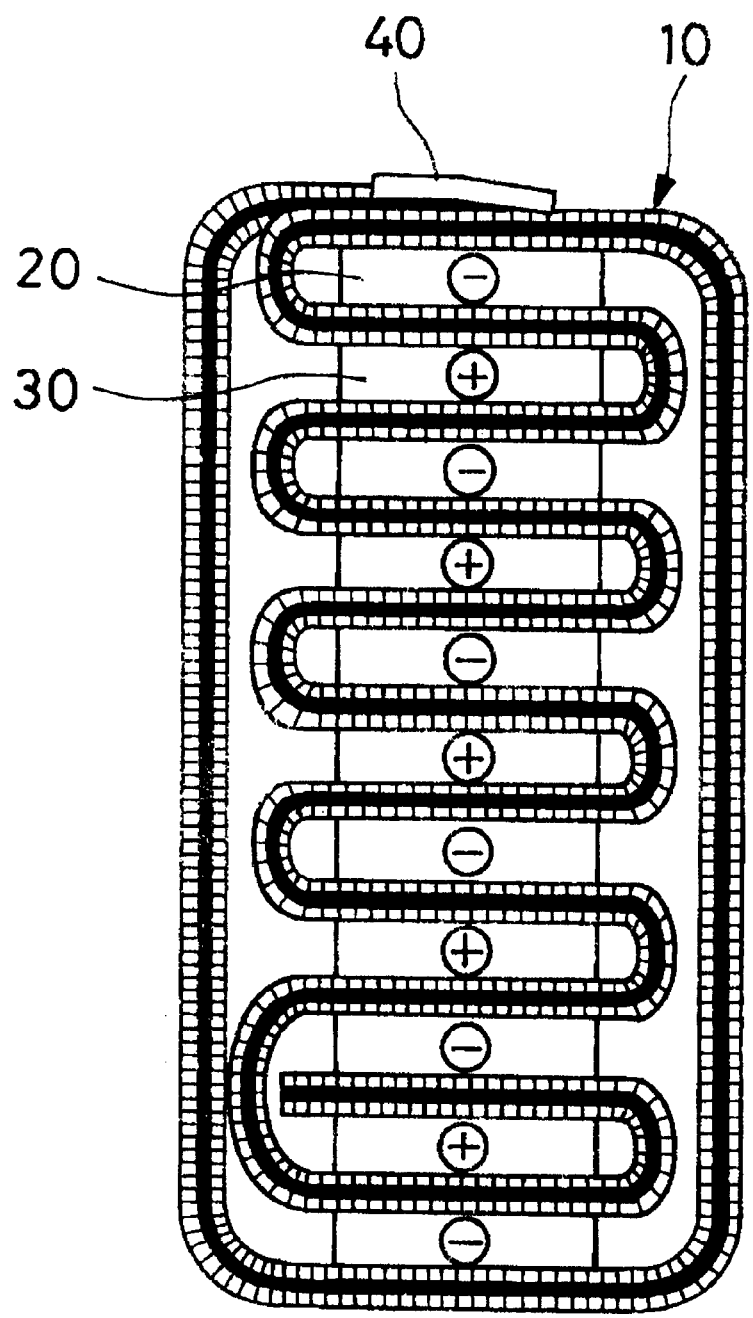
FIG. 1 is a cross-sectional view illustrating the construction of a lithium secondary battery produced according to the present invention.
Figure 2:
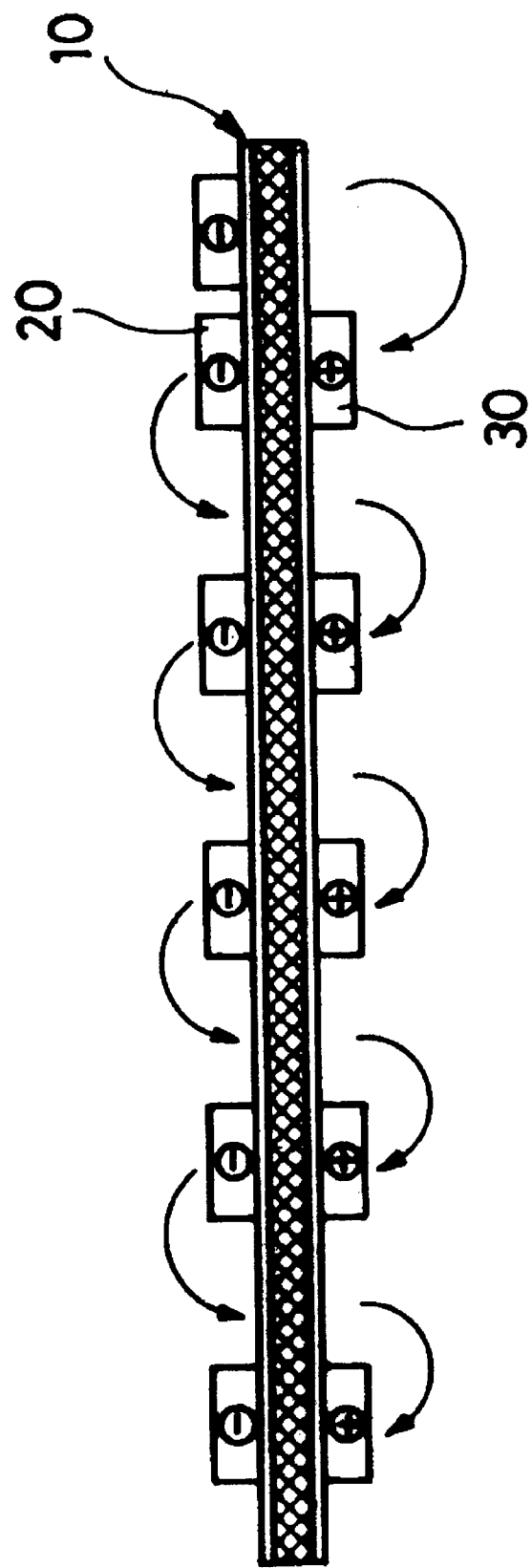
FIG. 2 is a diagram illustrating a lamination method used in the production of the lithium secondary battery in accordance with the present invention.
Figure 3:
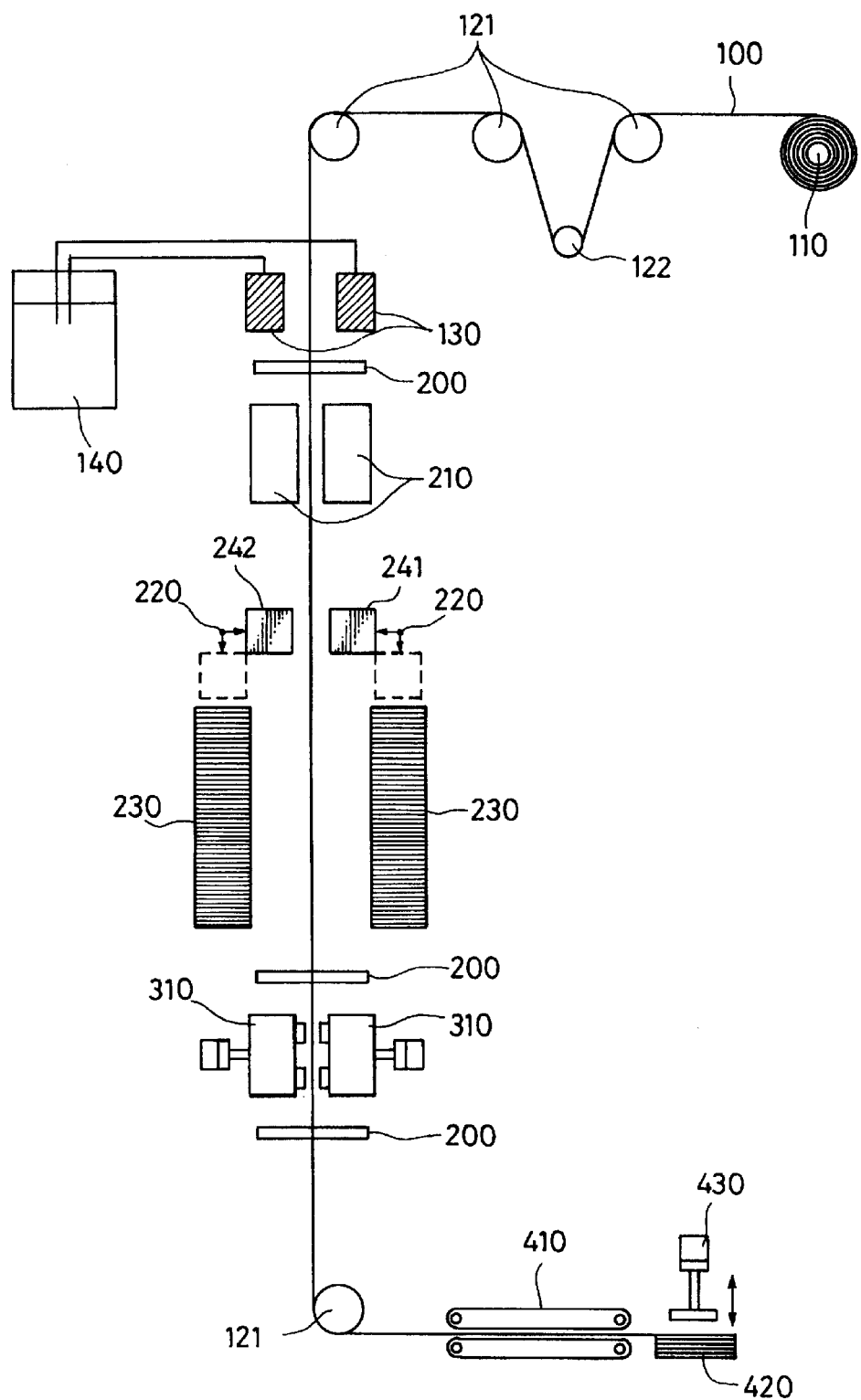
FIG. 3 is a schematic diagram showing processes for producing a lithium secondary battery according to the present invention.

Now, preferred embodiments of the present invention will be described in conjunction with reference to FIG. 3.

A separation film 100 is unwound from a roller 110. The unwound separation film 100 passes through guide rollers 121 and a dancer roller 122 to be fed to an adhesive coating station 130. After passing through the rollers, the separation film 100 is fed in a vertical direction.

Figure 4:
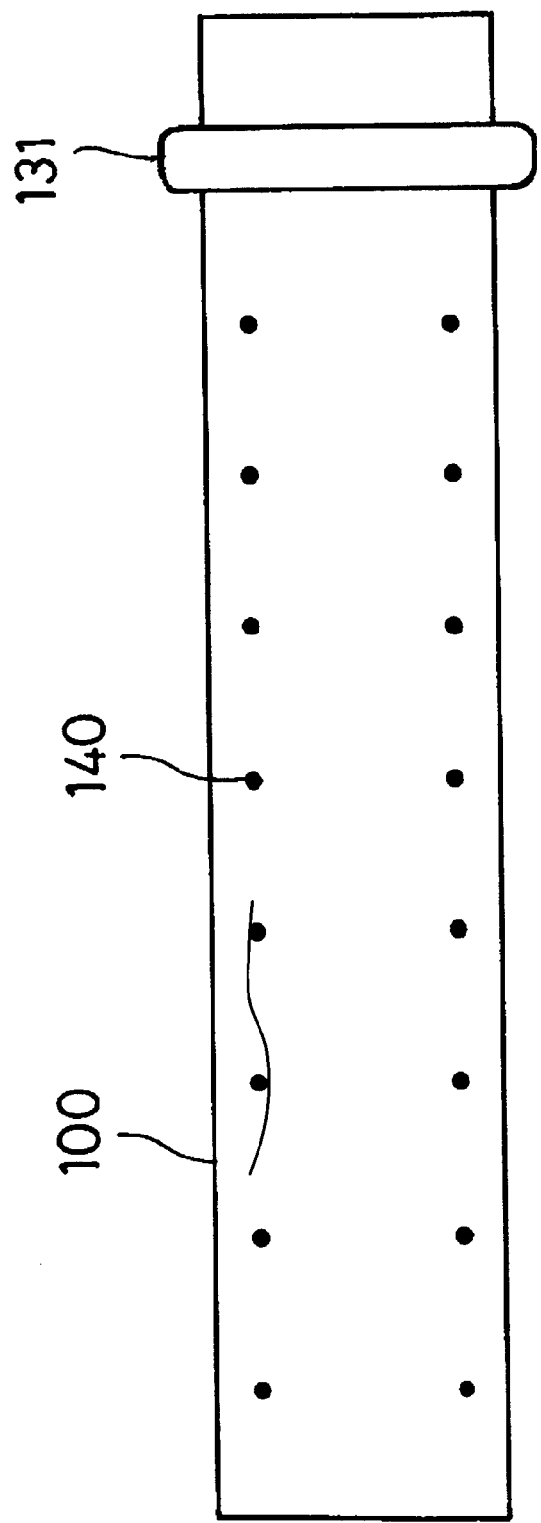
FIG. 4 is a side view showing the condition of an adhesive coated by using an air injector in accordance with the present invention.

In the adhesive coating station 130, an adhesive 140 is automatically injected from an air injector 131 onto the bonding areas of cathode plates 241 and anode plates 242, as shown in FIG. 4. As the separation film 100 is fed in a vertical direction, the adhesive 140 can be simultaneously injected onto both surfaces of the separation film 100, leading a high processing efficiency.

The separation film 100 coated with the adhesive passes through an index head 200 and heaters 210, and then reaches a bonding station for the cathode plates 241 and the anode plates 242. The cathode plates 241 and the anode plates 242 are bonded to the separation film 100. This bonding process is carried out by taking electrode plates from magazines 230 where those electrode plates are accumulated, and then bonding the taken electrode plates to the separation film 100 by use of an automatic bonding means 220 such as a robot. Likewise, the bonding of the electrode plates can be carried out simultaneously on the both surfaces of the separation film 100, leading a high processing efficiency.

The separation film 100 emerging from the index head 200 is then fed to laminators 310 at which the separation film 100 is fixed by a heat pressing process.

The separation film 100 is then fed to a stacker 420 via an index head 200, a guide roller 121 and a conveyer 410. In the stacker 420, the cathode plates 241 and the anode plates 242 are laminated alternately and pressed by a presser 430.

A cell preform is thus obtained. The cell preform is cut in a desired size, and then automatically packaged. Then, an electrolyte is filled into the packaged cell preform to make a final form of the cell. After vacuum packaging, a lithium secondary battery may be obtained.

As described above, the adhesive coating process, the electrode plates bonding process and the lamination process are carried out in a vertical fashion in accordance with the present invention. Accordingly, it is possible to solve the dislocation and deflection of the electrode plates resulting from a bending of the separation film involved in the conventional method carried out in a horizontal fashion. As a result, the producibility and quality of the products can be improved.

As apparent from the above description, the present invention implements a lithium secondary battery production in a vertical fashion, so that the number of processes used is reduced, thereby achieving an increase in production efficiency. Further, the condition of the adhesive coated is stabilized by virtue of the use of an air injector in the adhesive coating process, thereby resulting in an improvement in the conductivity of the electrode plates while prohibiting a dislocation of the separation film. As a result, it is possible to reduce the production of batteries having a degraded quality while achieving an improvement in battery performance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for producing a lithium secondary battery comprising the steps of:
   (1) unwinding a separation film for insulating electrodes by a roller;
   (2) simultaneously coating an adhesive by an air injector on both surfaces of the separation film at regions where cathode plates and anode plates are to be attached to the separation film;
   (3) simultaneously bonding the cathode plates and the anode plates respectively on the surfaces of the separation film while allowing the electrode plates on each surface of the separation film to be uniformly spaced apart from one another;
   (4) laminating the bonded cathode plates and anode plates; and
   (5) laminating the separation film bonded with the cathode plates and the anode plates so that the cathode plates and the anode plates are arranged alternately.

2. The method for producing a lithium secondary battery according to claim 1, wherein the air injector has a nozzle diameter of 50 to 300 μm.

3. The method for producing a lithium secondary battery according to claim 1, wherein the (2) to (4) steps are carried out in a state in which the separation film runs in a vertical direction.

* * * * *